United States Patent [19]

Schmitt

[11] Patent Number: 5,105,157
[45] Date of Patent: Apr. 14, 1992

[54] APPARATUS FOR DETERMINING THE AVERAGE WATER FILM THICKNESS OF ROAD SURFACES

[75] Inventor: Klemens Schmitt, Rothenbach, Fed. Rep. of Germany

[73] Assignee: TZN Forschungs-und Entwicklungszentrum Unterlüss GmbH, Unterlüss, Fed. Rep. of Germany

[21] Appl. No.: 623,161

[22] Filed: Dec. 6, 1990

[30] Foreign Application Priority Data

Dec. 9, 1989 [DE] Fed. Rep. of Germany ....... 3940710

[51] Int. Cl.$^5$ ............................................. G01R 27/04
[52] U.S. Cl. .................................. 324/644; 324/643; 324/640; 324/630
[58] Field of Search ............... 324/644, 643, 634, 635, 324/632, 631

[56] References Cited

U.S. PATENT DOCUMENTS

| | | | |
|---|---|---|---|
| 2,640,190 | 5/1953 | Rines | 324/644 |
| 4,052,666 | 10/1977 | Fletcher | 324/644 |
| 4,075,555 | 2/1978 | Wight | 324/644 |
| 4,492,915 | 1/1985 | Caspers | 324/644 |
| 4,623,835 | 11/1986 | Mehdizadeh | 324/644 |
| 4,690,553 | 9/1987 | Fukamizu et al. | |
| 4,789,820 | 12/1988 | Parrent | 324/644 |
| 4,818,930 | 4/1989 | Flemming | 324/643 |

FOREIGN PATENT DOCUMENTS

| | | |
|---|---|---|
| 0005696 | 6/1978 | European Pat. Off. . |
| 0189414 | 11/1984 | European Pat. Off. . |
| 2712199 | 9/1978 | Fed. Rep. of Germany . |
| 2912645 | 10/1980 | Fed. Rep. of Germany . |

OTHER PUBLICATIONS

H. Scharsching, "Berührungslose Feststellung der Fahrbahnnässe und Anwendung für Verkehrsbeeinflussungsanlagen", (Non-contacting Determination of the Wetness of a Roadway and Use for Traffic Control Systems), Vienna, 1986.

*Primary Examiner*—Kenneth A. Wieder
*Assistant Examiner*—Jose M. Solis
*Attorney, Agent, or Firm*—Spencer, Frank & Schneider

[57] ABSTRACT

A system for determining the average water film thickness on surfaces, and in particular roadways, with the reflection of microwaves on the surface of the film of water being measured. To be able to easily measure water film thicknesses of several millimeters without contact and with great accuracy, the system includes at least two partial systems which each comprise a signal source and a receiver. The individual partial systems operate at different frequencies which are selected such that the maximum accuracy measuring regions associated with the respective frequencies are contiguous and cover the predetermined water film thickness range to be determined. The partial systems are connected with a sampling and control device which activates at least that partial system which exhibits maximum measuring accuracy for the respective water film thickness being measured and utilizes only the output signal from the receiver of that partial system for the measurement.

14 Claims, 3 Drawing Sheets

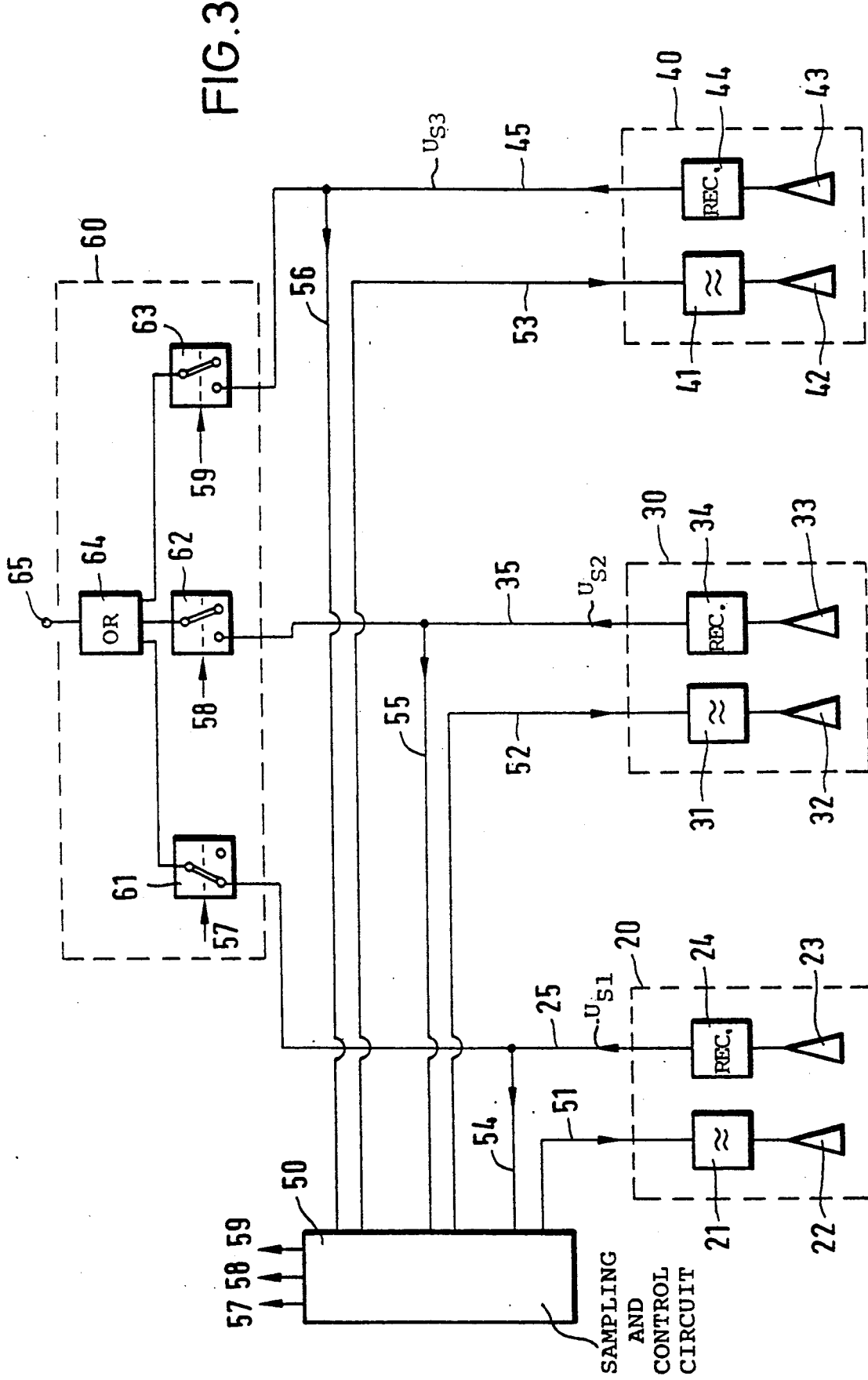

APPARATUS FOR DETERMINING THE AVERAGE WATER FILM THICKNESS OF ROAD SURFACES

REFERENCE TO RELATED APPLICATIONS

This application claims the priority of Federal Republic of Germany application Serial No. P 39 40 710.1 filed December 9th, 1989, which is incorporated herein by reference.

BACKGROUND OF THE INVENTION

The present invention relates to a method and apparatus for determining the average thickness of a film of water on a surface, for example a roadway, by measuring the reflection of microwaves from the surface of the film of water.

An apparatus of the above type is already disclosed in the dissertation by H. Scharsching, entitled "Berührungslose Feststellung der Fahrbahnnässe und Anwendung für Verkehrsbeeinflussungsanlagen" (Non-contacting Determination of the Wetness of a Roadway and Use for Traffic Control Systems), Vienna, 1986. The measuring frequency employed by Scharsching is 10.6 GHz so that unequivocal water film thickness measurements are possible only up to 0.8 mm. However, on the first page of the abstract of his work, Scharsching mentions that for greater water film thicknesses frequencies of 2.5 GHz or 0.44 GHz must be employed.

However, if low frequencies are employed, it must be considered that relatively inaccurate measuring results will be obtained particularly in the lower measuring range.

Federal Republic of Germany published patent application DE-AS 2,712,199 and European published patent application EP 0,005,696 disclose slippery road warning devices in which light of a certain wavelength from a light source is directed onto the surface of the roadway and the light reflected from the roadway is measured. The wavelength of the light should here be selected so that it lies at the absorption maximum of ice. This device takes advantage of the knowledge that ice has slightly different absorption bands than water and water vapor. Thus it is claimed to be possible to precisely determine the moment of ice formation even if the roadway is wet.

The drawback is primarily that it is not possible to measure the thickness of a film of water with this device. Moreover, the measuring result is greatly influenced by dirt on the transmitter and receiver, for example, due to slush, etc.

Federal Republic of Germany Laid-Open patent application DE-OS 2,912,645 discloses a slippery road warning device. This device measures the change in reflection of microwave radiation if there is ice formation. The drawback of this measurement device is likewise that it is not possible to measure the thickness of a film of water.

Federal Republic of Germany Laid-Open patent application DE-OS 3,023,444, corresponding to U.S. Pat. No. 4,690,553, discloses a road condition determination device which employs infrared light. The respective condition of the road is determined by an evaluation of the received scattered and reflected light. A determination of the thickness of a film of water on a wet road is not possible with this device.

Finally (see for example page 5, lines 15-25 of DE-OS 3,023,444), it is known to configure road condition determination devices so that a detector for determining water and temperatures is installed below the surface of the roadway. However, such a device is disadvantageous inasmuch as the installation of the detector requires considerable road work and the detector installed below the surface of the road is subjected to the danger of being damaged by the traffic on the road which might necessitate time and labor consuming maintenance work.

SUMMARY OF THE INVENTION

It is an object of the present invention to further develop the above-mentioned device for water film thickness measurement so that it is possible to measure, in a simple manner, the thickness of films of water up to several millimeters without contact and with great accuracy.

The above object is generally achieved according to the present invention by a system for determining the average thickness of a water film on a surface by measuring the reflection of microwaves on the surface of a film of water, wherein the system includes at least one signal source means for transmitting microwave signals at a given operating frequency toward the surface and at least one receiver means for receiving microwave signals at the given operating frequency reflected from the surface and for producing an output signal whose magnitude corresponds to the thickness of a film of water on the surface; and wherein: at least first and second of the signal source means and first and second of said receiver means associated respectively with the first and second signal source means are provided, with each of signal source means operating at a different frequency and with the respective frequencies being selected such that the measuring regions of maximum measuring accuracy associated with the respective frequencies are contiguous and cover the given water film thickness range to be measured; and, sampling and control means, which are responsive to the respective output signals from the receiver means, are provided for causing evaluation of only the output signal from the one of the receiving means whose associated operating frequency exhibits the maximum measuring accuracy at the respective water film thickness being measured.

According to features of the invention, the sampling and control means includes means for activating selected ones of the signal source means, and according to one embodiment, selectively activates only the signal source means operating at the frequency which exhibits the maximum measuring accuracy at the respective water film thickness being measured.

According to the preferred embodiment of the invention, the system further comprises a third signal source means and a third receiver means associated with the third signal source means, and with the third signal source means operating at a frequency between the operating frequencies of the first and second signal source means, and with the frequency of the first signal source means being higher than that of the second signal source means.

The invention is thus based on the idea of dividing the entire thickness range of a film of water to be measured into several partial ranges, with each partial range being measured with a different transmitting frequency which has been selected so that a high measuring accuracy is realized in the respective partial range. The partial systems operating at different frequencies are interconnected in such a manner that an unequivocal association between signal level and water film thickness is possible for any water film thickness, that is, ambiguities due to interferences are avoided.

The system is able to measure, without contact, water film thicknesses in the millimeter range. It can easily be installed after the roadway has been built. The surface over which the water layer thickness is averaged during the measurement can be determined by a selection of the transmitting antenna and its distance from the surface. In addition to a stationary arrangement above the roadway, it is also conceivable to arrange the device underneath vehicles so that the driver of this vehicle receives an automatic indication of the condition of the roadway.

Further details and advantages of the invention will now be described below in greater detail with reference to an embodiment thereof and with the aid of drawing figures.

BRIEF DESCRIPTION OF THE DRAWINGS

FIG. 3 is a block circuit diagram of a circuit according to the present invention which is composed of three partial systems as generally shown in FIG. 1.

DETAILED DESCRIPTION OF THE PREFERRED EMBODIMENTS

Figure 1:
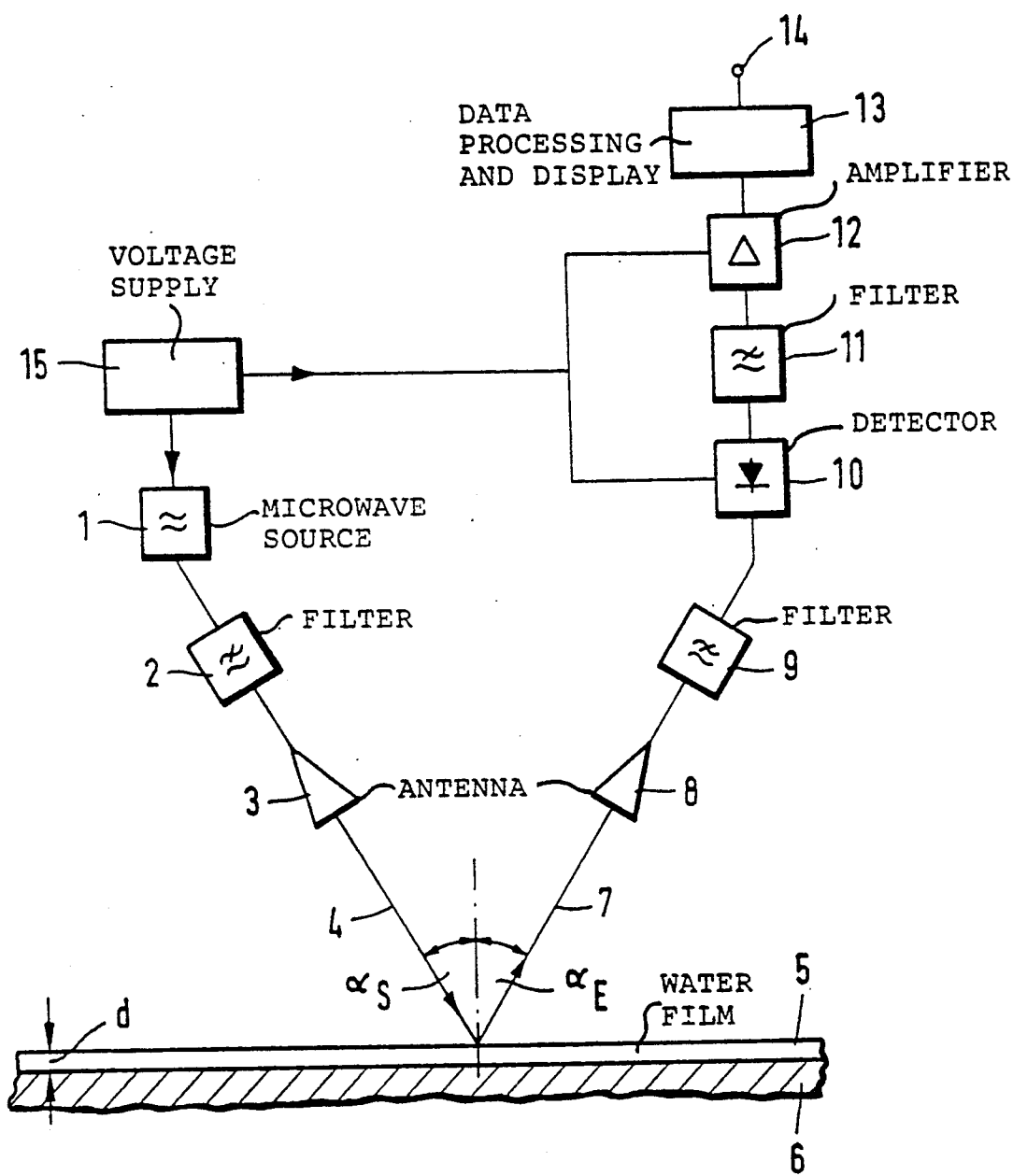
FIG. 1 is a block circuit diagram showing a prior art microwave measuring arrangement as it has already been disclosed by Scharsching.

Referring now to FIG. 1, there is shown a transmitter including a microwave signal source (e.g., a Gunn oscillator, quartz oscillator, etc.) which is followed by a filter 2 and a transmitting antenna 3 (e.g. a horn antenna with or without dielectric lens, etc.). The electromagnetic waves 4 generated by the antenna 3 reach the layer of water 5 disposed on a roadway 6. The reflected electromagnetic waves 7 are received by a further antenna 8 of a receiver and fed via a filter 9 to a detector 10. This detector 10 may either be a microwave detector (rectifier) or a mixer-filter combination followed by a rectifier (heterodyne receiver). Detector 10 is connected to a lowpass filter (integrator) 11 and an amplifier 12. In a data processing and display device 13, the measurement signals are evaluated and the result can be picked up at an output 14.

The transmitter and receiver are supplied with power by way of a voltage supply unit 15. The transmitting antenna 3 and the receiving antenna 8 are arranged at an angle $\alpha_S$ and $\alpha_E$, respectively, relative to the normal of the surface 6. Preferably, an angle $\alpha_S = \alpha_E$ of 0° to 30° is selected, although larger angles and angles $\alpha_S \neq \alpha_E$ are also possible. The transmitter radiation may be polarized horizontally, vertically, circularly or elliptically.

The operation of this known measuring circuit arrangement device which is known per se will now be described briefly.

The microwave radiation generated in signal source 1 is radiated, after passing through filter 2 and antenna 3, onto the surface of water film 5 to be examined. Filter 2 serves to suppress the emission of frequencies outside the frequency range permitted for such uses by the governmental regulating agency, e.g. the German Postal Service, or the U.S. Federal Communications Commission (FCC).

Part of the radiation 7 reflected by the irradiated surface 6 is received by the receiver antenna 8, or alternatively by transmitting antenna 3 to whose output is connected a directional coupler (not shown). After passing through filter 9, the received microwave radiation is rectified by means of a detector 10. This detector 10 is preferably operated in the square range of its characteristic where a linear relationship exists between the power of the microwave radiation and the detector output voltage.

Selectively, however, the microwave radiation may also be initially down-converted to a lower frequency in a mixer, may be filtered and then rectified by means of a detector. Additionally, the received microwave radiation, before it reaches detector 10, may be raised to a higher power level by means of a preamplifier (not shown).

After passing through the further filter (integrator) 11, the signal voltage resulting at the output of rectifier 10 is raised to the required output voltage level in an amplifier 12. In data processing and display device 13, the signal voltage US, which is a function of the thickness d of the film of water 5 on the irradiated surface 6, is picked up and processed further.

Figure 2:
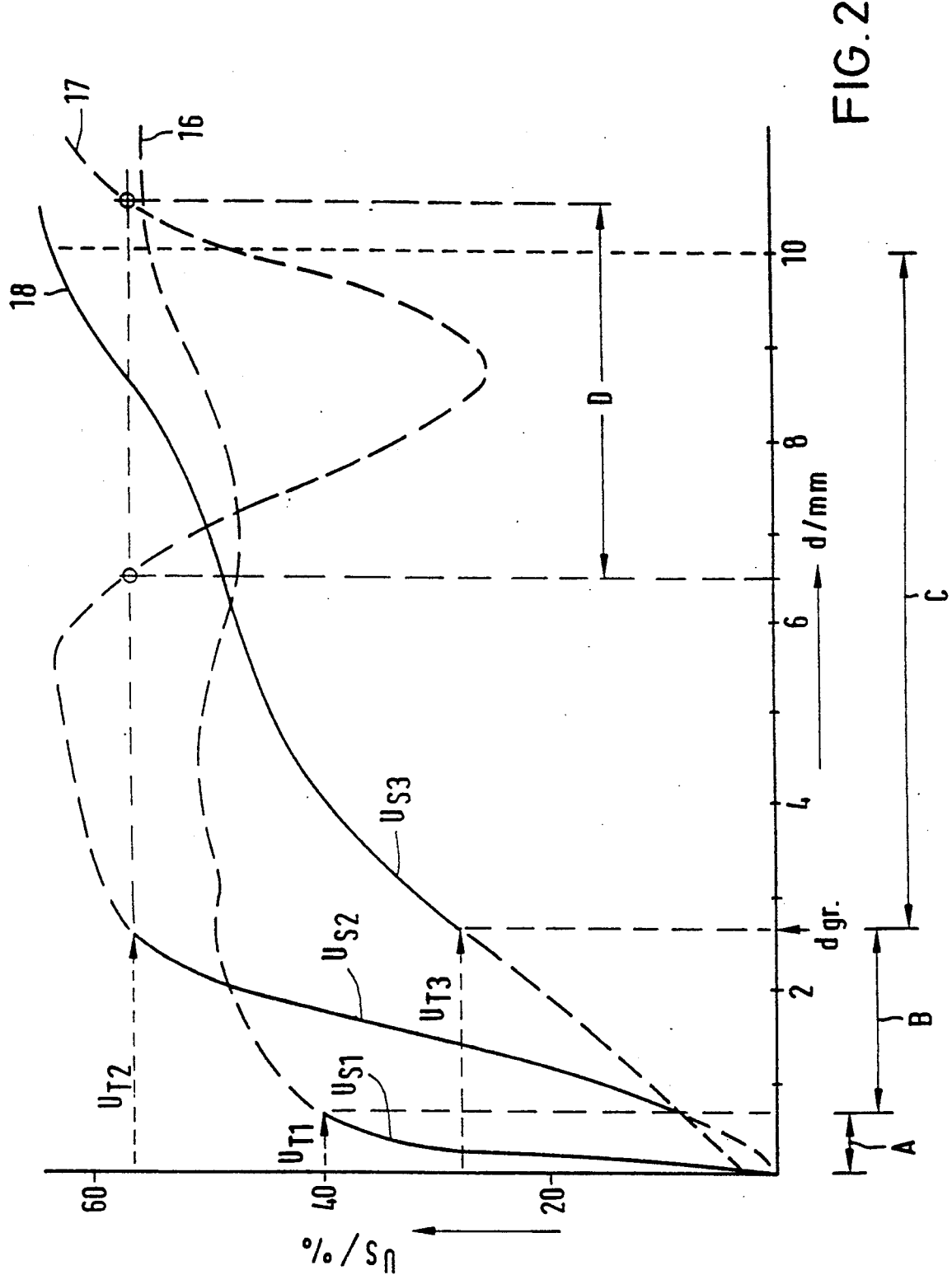
FIG. 2 shows the functional curve for the reflection at various frequencies as a function of the average water film thickness.

The dependence of signal level $U_S$ on the thickness d of the film of water on a roadway surface being examined for $\alpha_X = \alpha_E = 15°$ at various frequencies is shown in FIG. 2. The reference numeral 16 here indicates the curve for the signal level at 24.15 GHz, the reference numeral 17 represents the corresponding curve for 2.45 GHz, and the reference numeral 18 represents the signal level curve for a frequency of 0.434 GHz. Depending on the consistency of the surface 6 (e.g., its material, curvature, roughness), the signal level curves may deviate somewhat from the illustrated curves.

A marginal condition for practical use of the microwave system is that operation must take place only at authorized frequencies authorized, e.g. by the FCC in the United States or the Postal Service in Germany as mentioned above. Permission can generally be obtained only for those frequencies which are reserved for industrial use (e.g., 0.43305 to 0.43479 GHz, 2.40 to 2.50 GHz, 24.0 to 24.25 GHz).

FIG. 3 shows a circuit or device according to the present invention composed of three partial systems 20, 30 and 40, with each partial system essentially having the structure shown in FIG. 1 (except for data processing and display device 13). In addition, the device includes a sampling and control device 50 for coupling together and actuating partial systems 20, 30 and 40, and a signal processing device 60 for evaluating the individual signals.

In partial systems 20, 30 and 40, only the respective transmitters 21, 31 and 41, the respective antennas 22/23, 32/33 and 42/43 and the respective receivers 24, 34 and 44 are shown schematically. The signal sources of the respective transmitters 21, 31 and 41 of partial systems 20, 30 and 40 are connected with the sampling and control device 50 via respective control lines 51, 52 and 53. The output signals of respective receivers 24, 34 and 44 of the partial systems 20, 30 and 40 travel via respective line 25, 35, and 45 to the signal processing device 60 as well as, via a further respective line 54, 55 and 56 to the sampling and control device or circuit 50.

In the illustrated embodiment, the signal processing device 60 is essentially composed of three electronically controlled switches 61, 62 and 63 which connect respective lines 25, 35 and 45 with the inputs of an OR gate 64. The output of the OR gate is marked 65. The control terminals of switches 61, 62 and 63 are likewise connected, via respective lines 57, 58 and 59, with outputs of the sampling and control device 50.

The operation of the circuit arrangement shown in FIG. 3 will now be discussed in detail. In this connection, it is assumed that the first partial system 20 operates at a frequency of about 24.15 GHz, the second partial system 30 at a frequency of about 2.45 GHz and the third partial system at a frequency of about 0.434 GHz.

Initially, partial system 20, which has the highest operating frequency, is activated by sampling and control device 50 via line 51. Antenna 22 then radiates electromagnetic waves toward roadway 6 which is covered with a film of water (FIG. 1) and the reflected electromagnetic waves reach antenna 23. The appropriately amplified signal voltage $U_{S1}$ is fed via line 25 and switch 61 to OR gate 64 so that the corresponding signal value appears at output 65 of this OR gate. At the same time, the signal value $U_{S1}$ is fed via line 54 to sampling and control device 50. This device constantly compares the value $U_{S1}$ with a limit value $U_{T1}$ resulting from measurement curve 16 (FIG. 2) and constitutes the maximum value for partial system 20 from which value on no sufficient accuracy (linearity) and unambiguity can be realized in the measurements of the thickness of the layer of water 5. The comparison in sampling and control device 50 may be effected either by way of hardware with the aid of comparators or by way of software with the aid of a microprocessor.

For values $U_{S1} < U_{T1}$, switch 61 of signal processing device 60 remains closed (while switches 62 and 63 remain open) so that output voltage $U_{S1}$ of partial system 20 is present at output 65 of device 60.

For values of $U_{S1} \geq U_{T1}$, control signals are sent by circuit 50 through line 57 to switch 61 so that it is opened. At the same time, switch 62 is closed via control signals on line 58 so that now the output 65 of signal processing device 60 is connected with the output of the receiver 34 of partial system 30 via line 35. Additionally, the sampling and control device 50 deactivates the first partial system (via line 51) and activates the second partial system 30 (via line 52) and the third partial system 40 (via line 53). Similarly as described above, the signal voltage $U_{S2}$ of the second partial system is constantly monitored by the sampling and control device 50 and compared with a limit value $U_{T2}$ (see FIG. 2) which constitutes the limit value of measurement curve 17 for signal voltage $U_{S2}$ at which sufficient accuracy is no longer possible.

As can be seen in FIG. 2, $U_{S2}$ does not constitute an unequivocal function of the average thickness d of the water film 5 over the entire measuring range since there is a second value range D between about 6.5 mm and 10.5 mm for which signal voltage $U_{S2}$ is also less than limit value $U_{T2}$. Thus, for example, $U_{S2}$ has the same value at about 2 mm, 7.2 mm and 10 mm of average water film thickness. In order to make the water film thickness measurement unequivocal, the present invention preferably activates the partial system 40 together or simultaneously with the partial system 30. In this way, it can be ensured that the $U_{S2}$ value ($U_{S2} < U_{T2}$) reaching output 65 (FIG. 3) is the value resulting only from the water film thickness in region B which accordingly lies on the left side of the maximum of curve 17. This is the case precisely if $U_{S3}$ is less than $U_{T3}$, with $U_{S3}$ representing the signal voltage of receiver 44 and $U_{T3}$ the limit value of the signal voltage at which measuring region C of the partial system 40 begins.

The above thus indicates that, during the water film thickness measurement performed by the second partial system 30, the signal voltage $U_{S3}$ of the third partial system must also be constantly determined and monitored by sampling and control device 50 (FIG. 3). If the limit value $U_{T3}$ is exceeded, switch 62 is opened via control line 58 and switch 63 is closed via control line 59 so that now the signal voltage $U_{S3}$ of the partial system 40 is present at output 65 of signal processing device 60. This simultaneously ensures that only those $U_{S2}$ values which correspond to the left, ascending portion of curve 17 (FIG. 2) reach output 65. The measurement is thus unequivocal.

In FIG. 2, the measuring regions corresponding to partial systems 20, 30 and 40 are marked A, B and C, respectively. The corresponding curve sections of the signal voltages in the regions A, B and C are shown as solid lines and, as can be seen in FIG. 2, represent the regions of the respective curves with the greatest measuring accuracy, i.e., the greatest slope. As can further be seen in FIG. 2, the regions A, B and C are contiguous and cover the water film thickness range to be determined, e.g., 0 to 10 mm.

The adaptation of signal voltages $U_{S1}$, $U_{S2}$ and $U_{S3}$ to the limits of the measuring regions can be effected in that the signal voltages are amplified in such a manner that the signal voltage $U_{S1}$ at the end of measuring interval A, that is at limit value $U_{T1}$, is equal to the corresponding signal voltage $U_{S2}$, i.e. at the beginning of interval B. Moreover, signal voltage $U_{S3}$ should be amplified in such a way that the value of voltage $U_{S3}$ at limit value $U_{T3}$ is equal to the value of the corresponding limit value $U_{T2}$. On the basis of this adaptation of the signal levels at the boundaries of the measuring regions, signal voltage $U_S$ increases continuously with water film thickness d, independently of the respectively employed receiving frequency.

Another possibility for obtaining a continuous characteristic is to adapt the values of signal voltages $U_{S1}$ and $U_{S2}$ at the boundary between measuring intervals A and B by the addition of offset voltages $U_{OFF}$. At the transition from measuring interval B to measuring interval C, the signal voltage values $U_{S2}$ and $U_{S3}$ are likewise adapted to one another by the addition of an additional direct voltage level $U_{Off}$. With this additive adaptation of the signal voltage values at the boundaries of measuring regions A, B and C, it is possible to realize a value for signal voltages $U_S$ which continuously increases, as in the above solution, with the thickness d of the film of water.

The adaptation of signal voltages $U_{S1}$, $U_{S2}$ and $U_{S3}$ to the boundaries of the measuring regions can also be realized by a combination of signal voltage amplification and voltage addition. With this combined voltage equalization, the signal voltage characteristic of the microwave system, that is the dependence of the signal output voltage $U_S$ on the water layer thickness d can be optimized. This optimization can be effected, for example, with respect to the linearity of the $U_S(d)$ characteristic.

An optimization of the $U_S(d)$ characteristic with respect to its linearity can also be realized by means of an amplifier which is included in receivers 24, 34 and 44 and has a gain characteristic that is adapted to the nonlinearity of the $U_S(d)$ characteristic. Moreover, linearization of the $U_S(d)$ characteristic can be effected by the use of analog/digital converters provided with semiconductor memories connected to their outputs and disposed in receivers 24, 34 and 44. These memories receive correction values which effect linearization of signal voltage $U_S$ at the output of the memory.

With the device according to the present invention it is of course also possible to automatically modify the measuring sequences. For this purpose, if a microprocessor is employed, it is merely necessary to change the program in the sampling and control device. For example, it may be advisable to activate all partial systems 20, 30 and 40 via lines 51, 52 and 53, respectively, if it begins to rain. The respective signal values $U_{S1}$, $U_{S2}$ and $U_{S3}$ are fed via lines 54, 55 and 56, respectively, to the sampling and control device 50 and are there compared with the corresponding limit values. Corresponding to the measuring regions A, B and C shown in FIG. 2, one of these signal voltages is then switched to signal processing device 60 which records which one of the three partial systems was switched to signal output 65.

For a determination of the respective measuring region, the partial system 40 i.e, the system with the lowest operating frequency and thus the lowest accuracy in the lower thickness ranges, may also be activated initially and the signal voltage $U_{S3}$ measured by this system utilized to determine which of the partial systems 20, 30 or 40 should then be actually utilized to measure the water film thickness.

The invention now being fully described, it will be apparent to one of ordinary skill in the art that any changes and modifications can be made thereto without departing from the spirit or scope of the invention as set forth herein.

What is claimed is:

1. In a system for determining the average thickness of a water film on a surface by measuring the reflection of microwaves on the surface of a film of water, said system including at least one signal source means for transmitting microwave signals at a given operating frequency toward said surface and at least one receiver means for receiving microwave signals at said given operating frequency reflected from said surface and for producing an output signal whose magnitude corresponds to the thickness of a film of water on said surface; the improvement comprising:

at least first and second of said signal source means and first and second of said receiver means associated respectively with said first and second signal source means, with each of said signal source means operating at a different frequency and with the respective frequencies being selected such that the measuring regions of maximum measuring accuracy associated with the respective frequencies are contiguous and cover the given water film thickness range to be measured; and, sampling and control means, responsive to the respective said output signals from said receiver means, for causing evaluation of only the said output signal from the one of said receiving means whose associated operating frequency exhibits the maximum measuring accuracy at the respective water film thickness being measured.

2. A system for determining the average thickness of a water film as defined in claim 1 wherein said sampling and control means includes means for activating selected ones of said signal source means.

3. A system for determining the average thickness of a water film as defined in claim 2 wherein said sampling and control means includes means for selectively activating only the one of said signal source means operating at said frequency which exhibits the maximum measuring accuracy at the respective water film thickness being measured.

4. A system for determining the average thickness of a water film as defined in claim 2 further comprising a third said signal source means and a third said receiver means associated with said third signal source means, and with said third signal source means operating at a frequency between the operating frequencies of said first and second signal source means, and wherein the frequency of said first signal source means is higher than that of said second signal source means.

5. A system for determining the average thickness of a water film as defined in claim 4, wherein: the system is to be used for measuring the water film thickness d for a measuring range of $0 \leq d \leq 10$ mm; the frequency of said first signal source means lies between 24 and 24.25 GHz; the frequency of said third signal source means lies between 2.4 and 2.5 GHz; and the frequency of said second signal source means lies between 0.433 and 0.4348 GHz.

6. A method of operating the system defined in claim 5 comprising the steps of: initially activating only said first signal source means; using the output signal of said first receiver means for the film thickness measurement unless the output signal voltage exceeds a first predetermined limit value; if said first limit value is exceeded, activating said second and third signal source means and using the output signal of said third receiver means for the water film thickness measurement as long as the output signal voltage of said third receiver means does not exceed a second predetermined limit value and the output signal voltage of said second receiver means is below a third predetermined limit value; and using the output signal of said second receiver means for the film thickness measurement if the output signal voltage of said third receiver means exceeds said second predetermined limit value and the output signal voltage of said second receiver means is above said third predetermined limit value.

7. A method as defined in claim 6 wherein said second and third predetermined limit values correspond to substantially the same film thickness at the respective operating frequencies of said third and second signal source means, respectively.

8. A method of operating the system defined in claim 5 comprising the steps of: initially activating at least said second signal source means; determining from the output signal voltage of said second receiver means, in which of said regions of maximum measuring accuracy of the respective frequencies of said signal source means the water film thickness being measured lies; and then activating the determined one of said first and third signal source means and using the output signal of the associated said first and third receiver means to measure the water film thickness if said determined measuring region is not associated with said operating frequency of said second signal source means.

9. A method of operating the system defined in claim 8 wherein said step of initially activating includes activating only said second signal source means.

10. A method for determining the average thickness d of a water film on a surface, where $0 \leq d \leq 10$ mm, by measuring the reflection of microwaves on the surface of a film of water, said method including transmitting microwave signals at a given operating frequency from a signal source toward said surface, and receiving microwave signals at said given operating frequency reflected from said surface with a receiver which produces an output signal, whose magnitude corresponds to the thickness of a film of water on said surface, from the received signals; the improvement comprising:

providing first, second and third selectively activatable of said signal sources, and first, second and third of said receivers associated respectively with said first, second and third signal sources and producing respective first, second and third of said output signals, with said first signal source transmitting a first frequency between 24 and 24.25 GHz, said second signal source transmitting a second frequency between 2.4 and 2.5 GHz, and said third signal source transmitting a third frequency between 0.433 and 0.4348 GHz, when activated; and from said output signals of said receivers, determining and utilizing, as the film thickness measurement signal, only the said output signal from the one of said first, second and third receivers whose associated operating frequency exhibits the maximum measuring accuracy at the respective water film thickness currently being measured.

11. A method as defined in claim 10 further comprising the step of initially activating only said first signal source to transmit said first operating frequency; and wherein said step of determining and utilizing comprises: comparing said first output signal with a first predetermined limit value; using said first output signal as said film thickness measurement signal if said second output signal does not exceed said first predetermined limit value; activating said second and third signal sources to transmit said second and third operating frequencies if said first output signal exceeds said first limit value and comparing said second and third output signals with respective second and third predetermined limit values; using said second output signal as said water film thickness measurement signal as long as said second output signal does not exceed said second predetermined limit value and said third output signal is below said third predetermined limit value; and using said third output signal as said film thickness measurement signal if said second output signal exceeds said second predetermined limit value and said third output signal is above said third predetermined limit value.

12. A method as defined in claim 11 wherein said second and third predetermined limit values correspond to substantially the same film thickness at said second and third operating frequencies.

13. A method as defined in claim 10 further comprising the step of initially activating at least said third signal source to transmit said third operating frequency; and wherein said step of determining and utilizing comprises: evaluating said third output signal to determine the measuring region of the water film currently being measured and thus the associated one of said first, second and third operating frequencies which provides for maximum measuring accuracy in said determined measuring region; using said third output signal as said film thickness measurement signal if said determined measuring region is associated with said third operating frequency; and if said determined measuring region is not associated with said third operating frequency, activating, if necessary, the one of said first and second signal sources whose operating frequency is associated with said determined measuring region and using the associated one of said first and second output signals as said water film thickness measurement signal.

14. A method as defined in claim 13 wherein said step of initially activating includes activating only said third signal source.

* * * * *